(12) United States Patent
Matsukawa et al.

(10) Patent No.: US 6,999,003 B2
(45) Date of Patent: Feb. 14, 2006

(54) PARKING ASSISTANCE SYSTEM

(75) Inventors: Norifumi Matsukawa, Kariya (JP);
Yoshihisa Sato, Nagoya (JP); Koji Kato, Aichi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/146,107

(22) Filed: Jun. 7, 2005

(65) Prior Publication Data
US 2005/0285758 A1     Dec. 29, 2005

(30) Foreign Application Priority Data
Jun. 23, 2004    (JP)    .............................. 2004-185311

(51) Int. Cl.
*B60Q 1/48*    (2006.01)
(52) U.S. Cl. ................... 340/932.2; 340/933; 340/435; 340/436; 340/437; 340/903; 340/937
(58) Field of Classification Search .............. 340/932.2, 340/933, 438, 435, 436, 437, 903, 937
See application file for complete search history.

(56) References Cited

U.S. PATENT DOCUMENTS

| | | | |
|---|---|---|---|
| 6,265,968 B1 * | 7/2001 | Betzitza et al. | ............. 340/436 |
| 6,268,803 B1 * | 7/2001 | Gunderson et al. | ......... 340/903 |
| 6,819,284 B1 * | 11/2004 | Maier et al. | ................... 342/70 |
| 6,856,044 B1 * | 2/2005 | Ries-Mueller | ............. 307/10.2 |
| 6,894,608 B1 * | 5/2005 | Gunderson | ................... 340/468 |
| 6,898,527 B1 * | 5/2005 | Kimura et al. | .............. 701/301 |

FOREIGN PATENT DOCUMENTS

JP    A-2003-054341    2/2003

\* cited by examiner

*Primary Examiner*—Daryl C. Pope
(74) *Attorney, Agent, or Firm*—Posz Law Group, PLC

(57) ABSTRACT

During a period until a subject vehicle stops to go back for being parked, detection distance data items and advance distance data items are obtained by using an ultrasonic sensor and a speed sensor. These data items are stored with both the data items mutually associated. The detection distance data item indicates a distance to a parked vehicle adjacent to the subject vehicle and the advance distance data item indicates a distance in which the subject vehicle advances. When computing a size of the parked vehicle from the advance distance data items, the size of the parked vehicle is determined to be shorter than an aggregated distance corresponding to the advance distance data items. This enables the determined size of the parked vehicle to approximate an actual size of the parked vehicle.

9 Claims, 13 Drawing Sheets

PARKING ASSISTANCE SYSTEM

CROSS REFERENCE TO RELATED APPLICATIONS

This application is based on and incorporates herein by reference Japanese Patent Application No. 2004-185311 filed on Jun. 23, 2004.

FIELD OF THE INVENTION

The present invention relates to a parking assistance system that assists a driver to park a subject vehicle laterally or longitudinally parallel to a parked vehicle.

BACKGROUND OF THE INVENTION

Patent Document 1 describes a parking assistance system that conducts the following: acquiring obstruction information using an ultrasonic sensor while a subject vehicle is moved before parked; accumulating the obstruction information in a vicinity-map producing unit to thereby produce a map in the vicinity of the subject vehicle; retrieving and determining a target parking region based on the vicinity map; computing a target movement path to the target parking region; and displaying on a display the target movement path to be superimposed on an image rearward of the subject vehicle.

Patent Document 1: JP-2003-54341 A

When a subject vehicle is to be parked in a parking space in a parking lot, a previously parked vehicle may be present in the vicinity of the parking space. Therefore, determining a target parking region where the subject vehicle is expected to be parked requires accurately detecting a position or a size of the previously parked vehicle.

However, detecting a neighboring vehicle using the ultrasonic sensor as described in Patent Document 1 does not result in accurately detecting the size or the like of the neighboring vehicle. The reason of this difficulty is as follows. First, an advance distance of the subject vehicle while the reflected waves are being received is regarded as a size of the parked vehicle. However, a corner of a vehicle is typically not right-angled but intricately-curved. An ultrasonic sensor of the subject vehicle thereby receives ultrasonic waves reflected from a part of the corner of the parked vehicle before the corner of the parked vehicle becomes situated perpendicularly to (or just in front of) the setting position of the ultrasonic sensor. Receiving the reflected waves is varied depending on a shape of the corner of the parked vehicle or a relative direction between the subject vehicle and the parked vehicle. Consequently, the advance distance while the reflected waves are being received does not simply correspond to the size of the parked vehicle to thereby tend to provide an improper parking assistance.

SUMMARY OF THE INVENTION

It is an object of the present invention to provide a parking assistance system to solve the above problem. This system properly conducts parking assistance by enhancing a measuring accuracy relating to a parked vehicle while using a distance measuring unit such as an ultrasonic sensor.

To achieve the above object, a parking assistance system provided in a subject vehicle is provided with the following. A first distance measuring unit is included for measuring a distance from a side of the subject vehicle to a parked vehicle based on a time period from when transmitting a signal that is transmitted from the side with directionality to when receiving a reflected signal. A second distance measuring unit is included for measuring an advance distance in an advance direction of the subject vehicle. A storing unit is included for associating parked-vehicle distance data with advance distance data to store the parked-vehicle distance data and the advance distance data, wherein the parked-vehicle distance data indicates distances that are repeatedly measured by the first distance measuring unit while the advance distance data indicates advance distances measured by the second distance measuring unit. A size determining unit is included for determining a size of the parked vehicle in the advance direction of the subject vehicle so that the size is shorter than a distance corresponding to the advance distance data. A setting unit is included for setting a target parking region adjacent to the parked vehicle based on the determined size, wherein the subject vehicle is expected to be parked in the target parking region. Further, an operation assisting unit is included for computing a positional relationship between the subject vehicle and the parked vehicle based on the parked-vehicle distance data and the advance distance data and then conducting an operation assistance for parking the subject vehicle in the target parking region.

In general, a corner of a vehicle has a curved shape. A relative directional relationship between a subject vehicle and a parked vehicle affects measuring an inter-vehicle distance between both the vehicles. Further, advance distance data obtained based on the inter-vehicle distance includes deviations, accordingly. As a result, a size of the parked vehicle obtained based on the advance distance data has a tendency to be computed to be larger than an actual size. In contrast, under the structure of the present invention, when computing a size of a parked vehicle from advance distance data, the size of the parked vehicle is determined to become shorter than a distance corresponding to the measured advance distance data. This enables the determined size to approximate the actual size of the parked vehicle to thereby enhance accuracy in measuring the size. Parking assistance for setting the target parking region and then parking the subject vehicle in this target parking region can be therefore properly achieved.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A parking assistance system 100 according to an embodiment of the present invention will be explained with reference to drawings.

Figure 1:
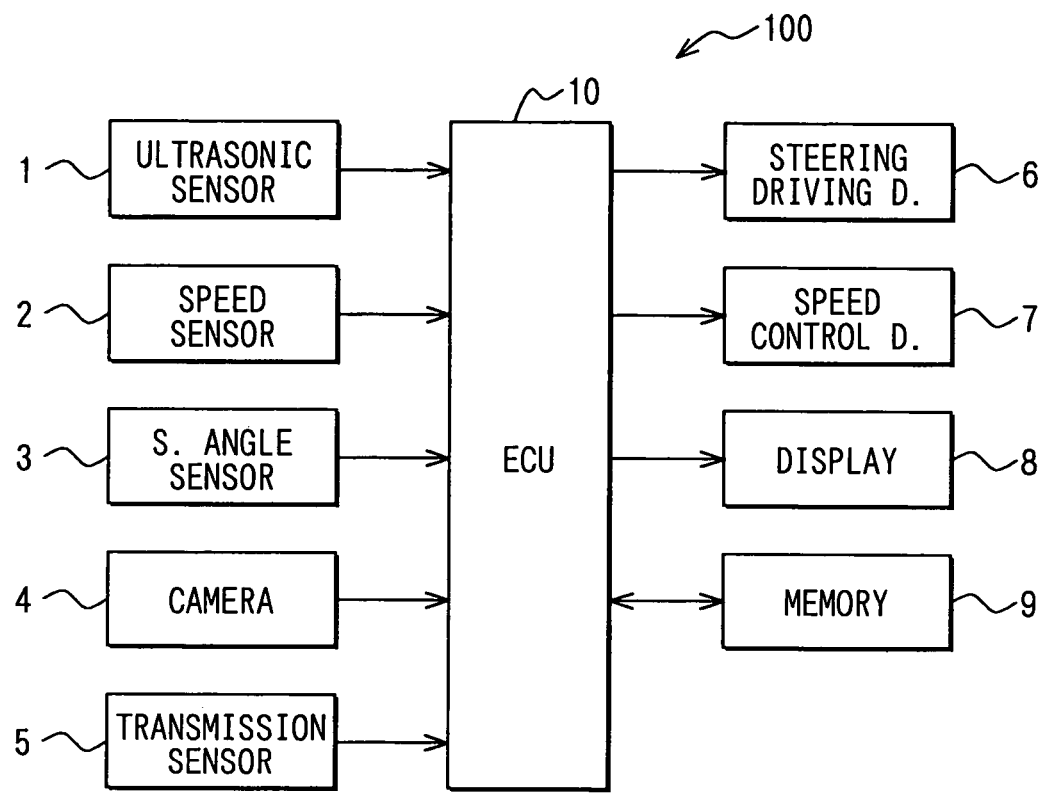
FIG. 1 is a block diagram of a parking assistance system according to an embodiment of the present invention.
Figure 2:
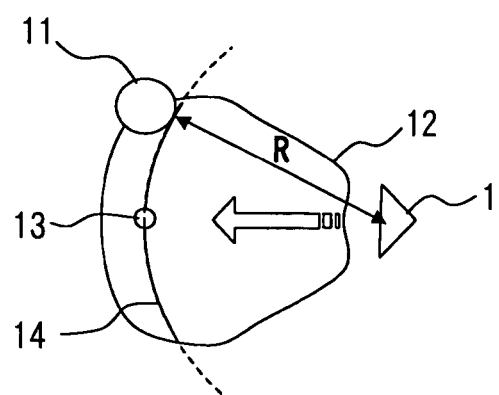
FIG. 2 is a view of a detection range of an ultrasonic sensor.

The system 100 provided in a subject vehicle includes the following 1 to 10 as shown FIG. 1. An ultrasonic sensor 1 includes a transmitter and a receiver using a piezoelectric element and is disposed on both sides of the subject vehicle for measuring an inter-vehicle distance from the side to a parked vehicle. As shown in FIG. 2, the ultrasonic sensor 1 has directionality to transmit ultrasonic waves from the transmitter and receive ultrasonic waves reflected by an obstruction 11 via the receiver. A detection distance from the side of the subject vehicle to the obstruction 11 (or parked vehicle) is obtained from a time period from when the ultrasonic waves are transmitted to when the reflected ultrasonic waves are received.

A speed sensor 2 is disposed in proximity to a traveling wheel to output a signal of a cycle corresponding to a rotational speed of the wheel using a pickup coil or a magnetic resistance element. This speed sensor 2 is used for computing an advance direction of the subject vehicle.

The time period (from transmission to reception of the ultrasonic waves) obtained by the ultrasonic sensor 1 is converted to an detection distance, while the speed obtained by the speed sensor 2 is converted to an advance distance of the subject vehicle. Both of the detection distance and the advance distance are associated with each other to be stored in a memory 9.

A steering angle sensor 3 detects a steering angle of a steering wheel (not shown) for conducting a parking assistance process that parks the subject vehicle in a target parking region. A camera 4 is disposed in an upper portion of the back of the subject vehicle to photograph a state rearward of the subject vehicle when the subject vehicle goes back for being parked and thereby display the state on a display 8 in proximity to a driver's seat inside a vehicle interior. The display 8 shows a frame indicating the target parking region in addition to the state rearward of the subject vehicle. A transmission sensor 5 detects a shift position of a transmission of the subject vehicle to output it to an ECU 10. The ECU 10 starts the parking assistance process by determining that a trigger for starting the parking assistance process is turned on when the shift position is switched to a shift position for going back.

The ECU 10 includes a known RAM, ROM, CPU, and I/O to receive detection signals from the above-described sensors and conduct various control process base on the received detection signals. The ECU 10 comprehends a state of a parked vehicle in the vicinity of the subject vehicle by using the detection results of the ultrasonic sensor 1 and the sensor 2 stored in the memory 9 before the parking assistance process starts to move back of the subject vehicle when the trigger is turned on. Based on the comprehended state, the ECU 10 sets a target parking region. Here, the pa process includes controlling of a steering driving device 6 and a speed control device 7 for automatically moving the subject vehicle to the target parking region.

The steering driving device 6 includes a driving motor for rotationally driving a steering shaft (not shown) based on instruction of the ECU 10. Here, a steering angle of the steering wheel is detected by the steering angle sensor 3, and the ECU 10 conducts feedback control to achieve a preferable steering angle of the steering wheel.

The ECU 10 computes a traveling track to reach an inside of the target parking region from the position where the subject vehicle starts to go back to thereby compute a steering angle at each position on the computed traveling track so that the subject vehicle moves on the computed traveling track. The ECU 10 outputs control signals to the steering driving device 6 based on the computed steering angles. Further, the ECU 10 outputs control signals to the speed control device 7 so that the subject vehicle moves at an approximately constant speed during moving back of the subject vehicle. Here, the speed control device 7 includes an engine control device and/or a throttle driving device. Thus, the subject vehicle is moved from the moving-back starting position to the inside of the target parking region. Of this automatic parking operation, a control process is known, so explanation will be removed hereinbelow.

This embodiment has a feature in almost automatically setting a target parking region. When a subject vehicle is parked into a target parking space in a parking lot or the like, there is a case that a parked vehicle is present around this space. A driver who is unfamiliar with operating vehicles typically dislikes a parking operation that parks the subject vehicle laterally or longitudinally parallel with the parked vehicle. To solve this difficultly, there is practically used a parking system that determines a predetermined target parking region and automatically operates the subject vehicle to this region. This parking system shows a frame indicating a target parking region over a photographed image rearward of the subject vehicle. Here, a driver of the subject vehicle needs to manually adjust a position of the frame, which takes a time to set the target parking region.

In contrast, this embodiment automatically sets a target parking region to thereby help save a time period or a work load necessary for starting the parking assistance process. This embodiment can be adapted to cases where a subject vehicle is parked not only laterally parallel with an adjacent parked vehicle (to be explained later in detail), but also longitudinally parallel with an adjacent parked vehicle. Automatic setting of a target parking region can further include driver's selecting of whether the subject vehicle is to be parked laterally or longitudinally parallel with an adjacent parked vehicle or of whether the target parking region is to be set right rearward or left rearward. This enables the parking assistance to follow an intention of the driver.

Figure 3:
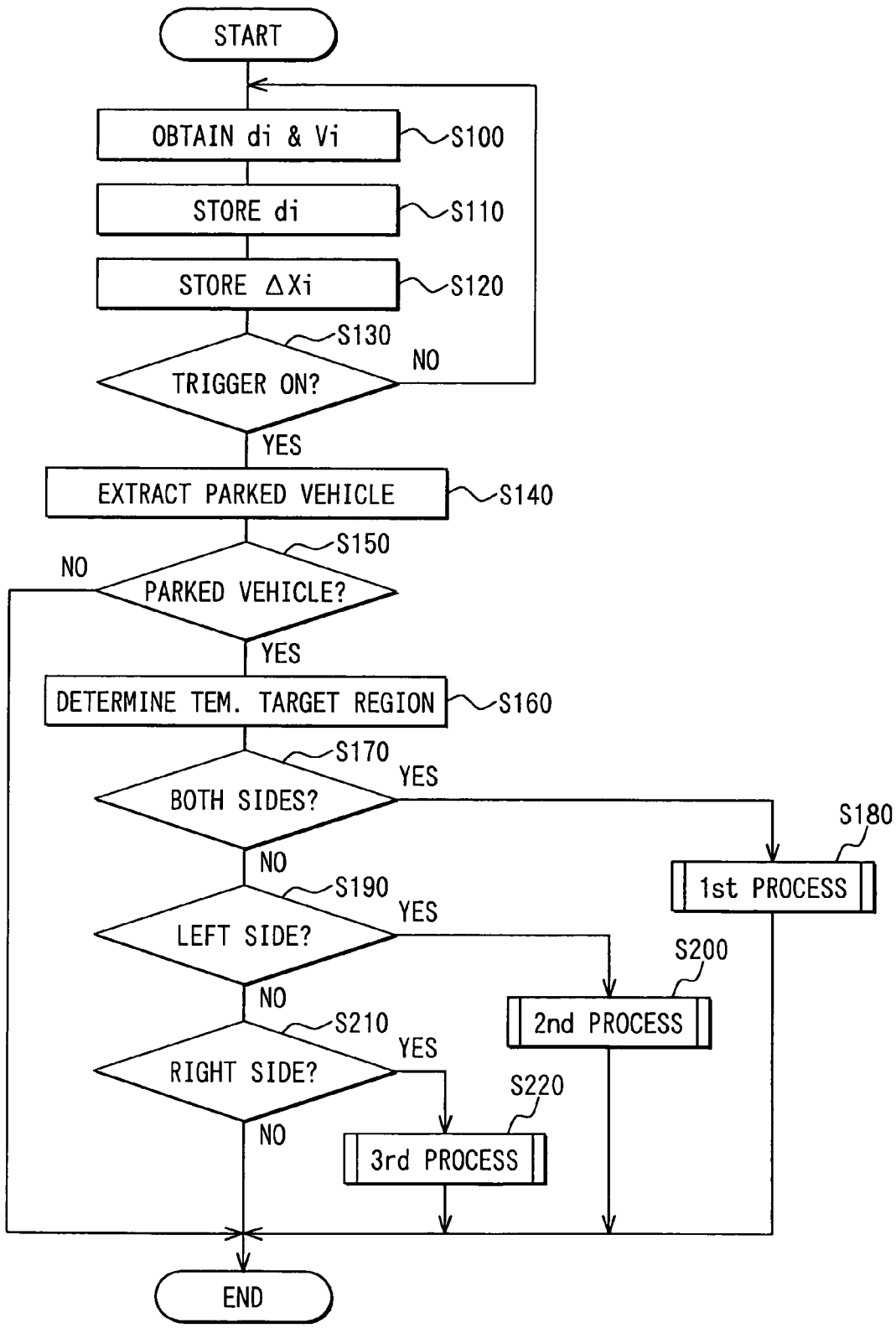
FIG. 3 is a flowchart diagram of a main routine of a parking assistance process.

Next, a main routine of a parking assistance process of this embodiment will be explained with reference to a flowchart in FIG. 3. Firstly, at Step S100, a detection distance data item di indicating a distance to a parked vehicle is obtained from the ultrasonic sensor 1, while a speed data item Vi is synchronously obtained from the speed sensor 2. At Step S120, the obtained detection distance data item di is stored in a memory 9. At Step S120, the obtained speed data item Vi is converted to an advance distance data item ΔXi of the subject vehicle that is then stored in the memory 9. The detection distance data item di and the advance distance data item ΔXi are parked vehicle data relating to a position or a size of the parked vehicle.

Next, the process where the parked vehicle data is stored in the memory 9 will be explained in detail below with reference to FIG. 4. The memory 9 includes three regions of Memory A, Memory B, and Memory C.

Memory A stores detection distance data or data items di (i=0 to n) which is obtained by multiplying by an ultrasonic wave speed a time period detected by the ultrasonic sensor 1 from transmission to reception of ultrasonic waves and then dividing the multiplied product by two. The detection distance data items di are computed every unit time period Δt and then stored. When the ultrasonic sensor 1 receives no reflected ultrasonic waves, zero is stored in Memory A.

Memory B stores speed data or data items Vi (i=0 to n) which are detected by the speed sensor 2. The speed data items Vi are computed similarly every unit time period Δt. In sum, the detection distance data di and the speed data Vi are synchronously measured and stored in Memories A, B, respectively.

Memory C stores advance distance data or data items ΔXi indicating advance distances of the subject vehicle based on the speed data Vi. In other words, an advance distance data item ΔXi per a unit time period Δt is computed from a speed data item Vi stored in Memory B and then stored in Memory C.

Figure 4:
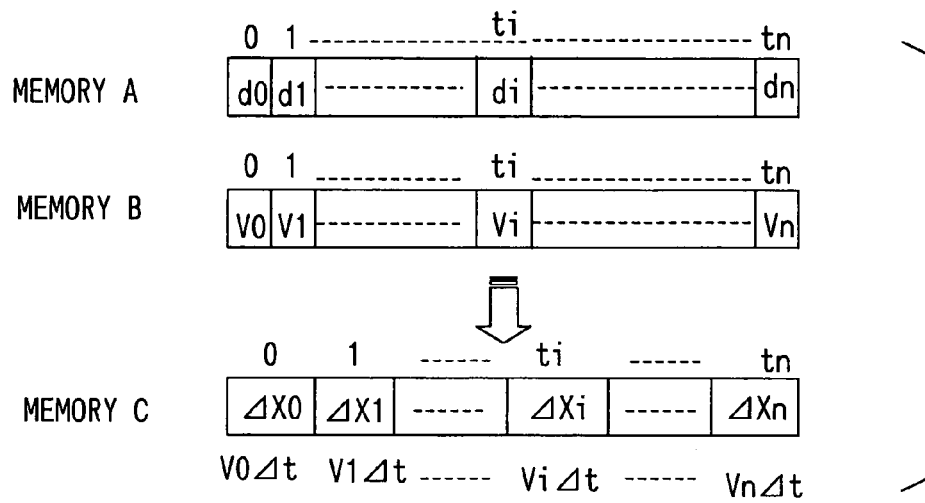
FIG. 4 is a diagram explaining a process taking place when parked vehicle data is stored.

In FIG. 4, ti in Memories A to C represents elapse of unit time periods. Here, zero is the oldest, while tn is the latest. Memories A to C have sufficient storage volumes for conducting process to be explained below.

Addition of the advance distance data items ΔXi during receiving the reflected ultrasonic waves can obtain, of a relevant parked vehicle, a size or a length in an advance direction of the subject vehicle. Therefore, states of a parked vehicle in the vicinity of the subject vehicle such as a gap or a distance between the subject vehicle and the parked vehicle, a size of the parked vehicle, or a relative position of the parked vehicle can be acquired from the detection distance data di and the advance distance data ΔXi.

At Step S130, it is determined whether the transmission is switched to a shift position for going back and a trigger for the parking assistance is turned on, based on a detection signal of the transmission sensor 5. When this determination is negated, the sequence returns to Step S100 for repeating measuring the parked vehicle data. Thus, while the subject vehicle moves towards a position where the subject vehicle starts to go back for being parked, measuring data relating to a parked vehicle around the subject vehicle can be continued. In contrast, when the determination at Step S130 is affirmed, the sequence goes to Step S140.

At Step S140, data pertinent to the parked vehicle is extracted by determining whether the detection distance data di and the advance distance data ΔXi stored in the memory 9 are pertinent to the parked vehicle or not.

Figure 5:
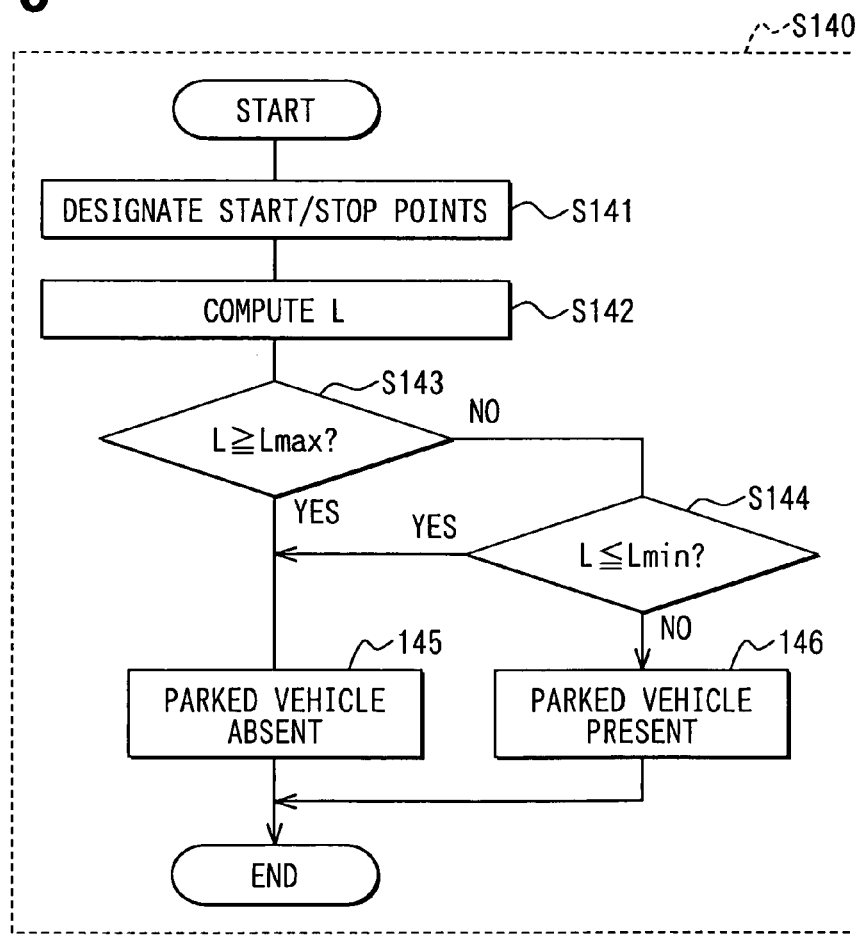
FIG. 5 is a flowchart diagram of a parked vehicle extraction process.

The process at Step S140 will be explained with reference to a flowchart diagram in FIG. 5. At Step S141, a detection start point and a detection stop point are designated based on the detection distance data di. This detection start point is a point where a state without an obstruction detected is switched to a state with an obstruction detected. The detection stop point is a point where a state with an obstruction detected is switched to a state without an obstruction detected. The state with an obstruction detected means a state that detection distance data di is present (or stored). The state without an obstruction detected means a state that the detection distance data di is zero that represents no detection of an obstruction.

At Step S142, a distance L indicating an advance distance of the subject vehicle from the detection start point to the detection stop point is computed based on the advance distance data ΔXi. This distance L indicates a size of the relevant parked vehicle in the advance direction of the subject vehicle. At Step S143, the distance L is compared with a maximum width (or length) Lmax that can be regarded as that of a vehicle. When the distance L is the maximum width Lmax or more, the relevant obstruction is not regarded as a vehicle. The sequence thereby goes to Step S145, where it is determined that no parked vehicle is present. In contrast, when the distance L is not more than the maximum width Lmax, the sequence thereby goes to Step S144. Here, the distance L is compared with a minimum width (or length) Lmin that can be regarded as that of a vehicle. When the distance L is the minimum width Lmin or less, the relevant obstruction is not regarded as a vehicle. The sequence thereby goes to Step S145, where it is determined that no parked vehicle is present.

In contrast, when the determinations at Steps S143, 144 are both negated, a size of the relevant obstruction can be regarded as a parked vehicle, the sequence thereby goes to Step S146. Here, It is determined that a parked vehicle is present.

When multiple pairs of detection start points and detection stop points are designated, it is determined with respect to each of the pairs whether they are pertinent to a parked vehicle.

Now, returning to FIG. 3, at Step S140, when a parked vehicle is not extracted, it is determined that no parked vehicle is present at a determining process at Step S150. When it is determined that no parked vehicle is present, the process of this flowchart ends because parking the subject vehicle can be easily conducted without the parking assistance process. However, similarly to the conventional process, a target parking region can be determined using a display frame shown on a display screen and then the subject vehicle can be automatically moved back into the target parking region.

At Step S160, a temporary target parking region is determined based on the extracted result at Step S140. This temporary target parking region is a space where the subject vehicle can be moved back from the subject vehicle's stopping point for being parked and where no obstruction such as a parked vehicle is present. At Step S170, it is determined whether a parked vehicle is present in each of both the sides of the temporary target parking region. When this determination is affirmed, the sequence goes to Step S180, where a space sandwiched by two parked vehicles is set to a target parking region. Then a first parking assistance process takes place that automatically moves the subject vehicle into the target parking region.

Figure 6:
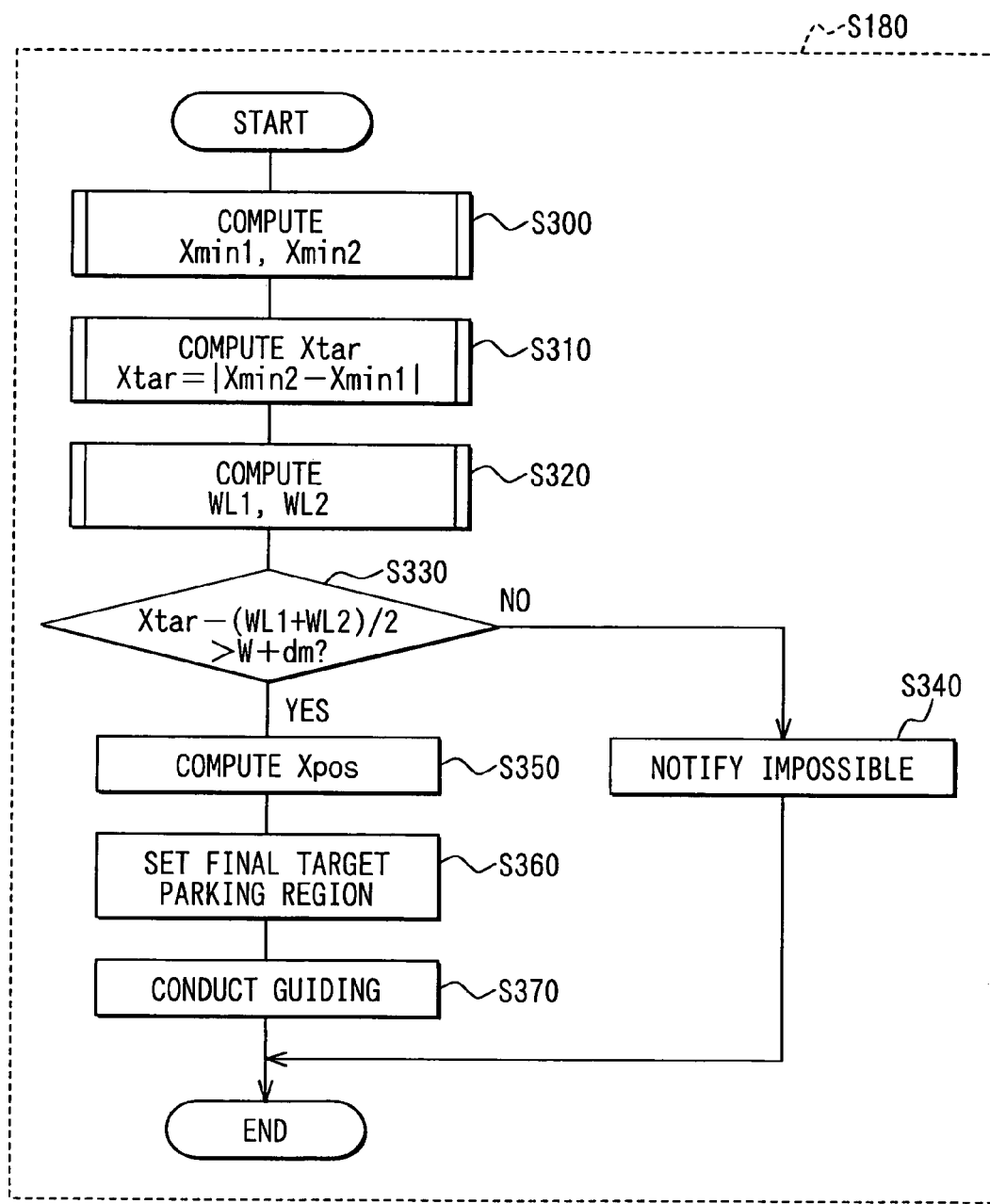
FIG. 6 is a flowchart diagram of a first parking assistance process.
Figure 7:
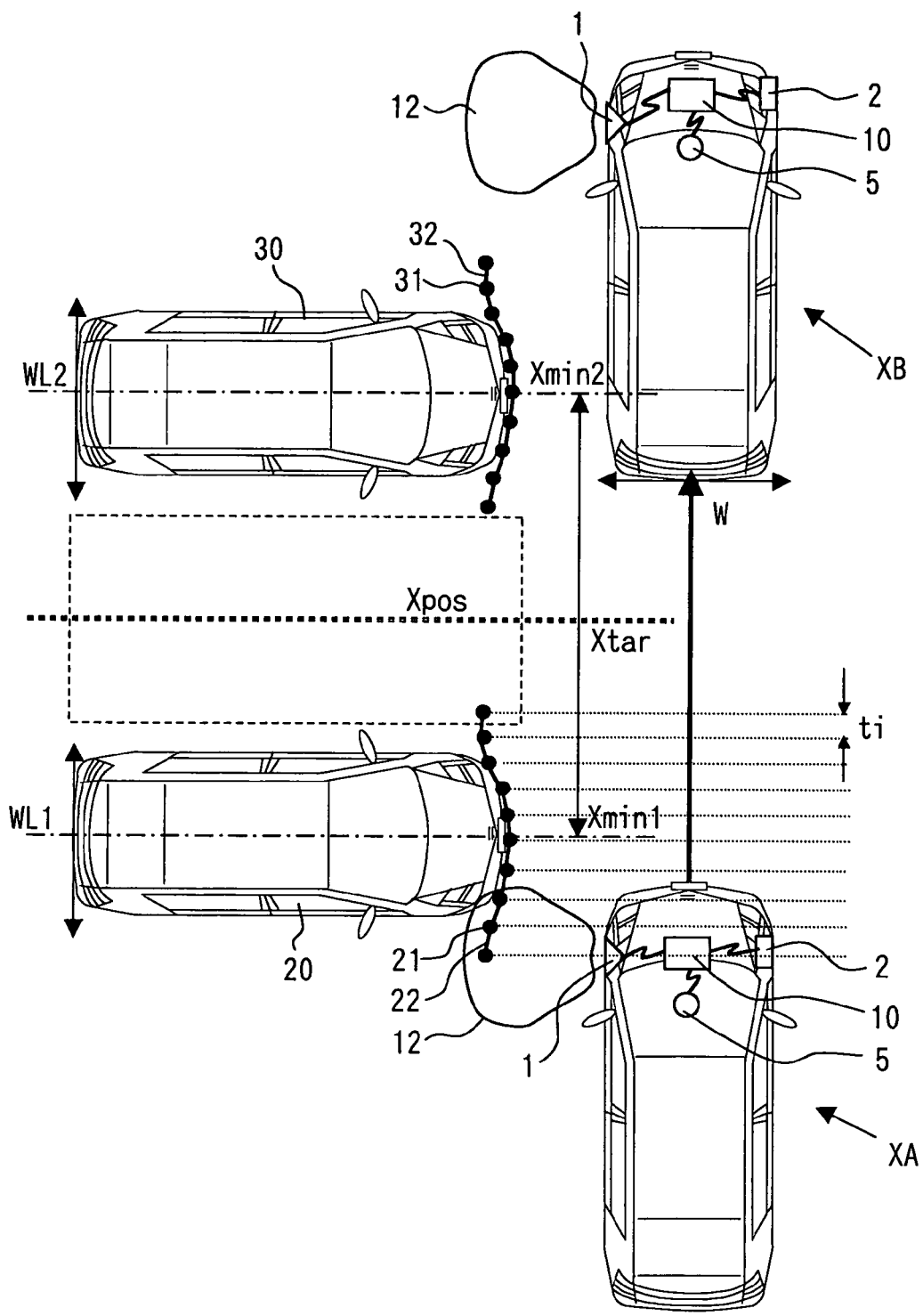
FIG. 7 is a view showing a first parking assistance process.

The first parking assistance process is shown in FIG. 6. At Step S300, center positions Xmin1, Xmin2 of the parked vehicles 20, 30 parked on both the sides of the temporary target parking region are computed as shown in FIG. 7. This view in FIG. 7 shows a case that the subject vehicle detects two parked vehicles 20, 30 on the left side while the subject vehicle moves from a position XA to a position XB. Here, the ultrasonic sensor 1 is only shown on the left side of the subject vehicle for simplifying the view; however, in fact, the ultrasonic sensors 1 are disposed on both the (right and left) sides. Further, numeral signs 21, 31 denote points measured by the ultrasonic sensor 1 every unit time period ti. A detection data item di is obtained from each of the points measured. Further, numeral signs 22, 32 denote line segments outlining shapes of the parked vehicles 20, 30, respectively by connecting the detection distance data di.

Figure 8:
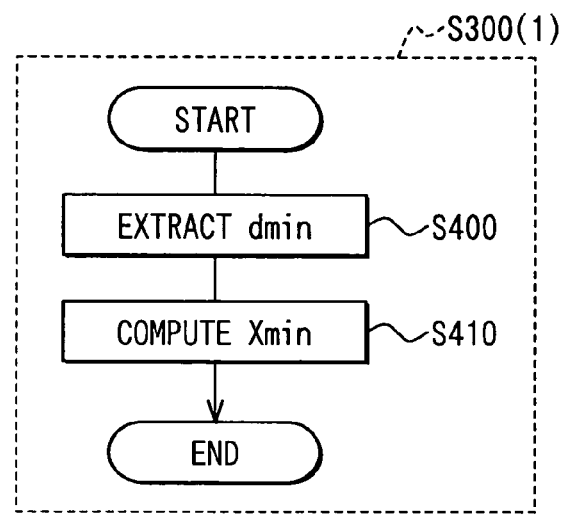
FIG. 8 is a flowchart diagram of a center position computation process.

Next, a center position computation process at Step S300 in FIG. 6 is shown in a flowchart diagram in FIG. 8. At Step S400, a minimum value dmin is extracted among the detection distance data di of the parked data grouped with respect to each of the parked vehicles 20, 30. At Step S410, a center position Xmin1, Xmin2 where the minimum value dmin is obtained is computed from the advance distance data ΔXi.

Figure 9:
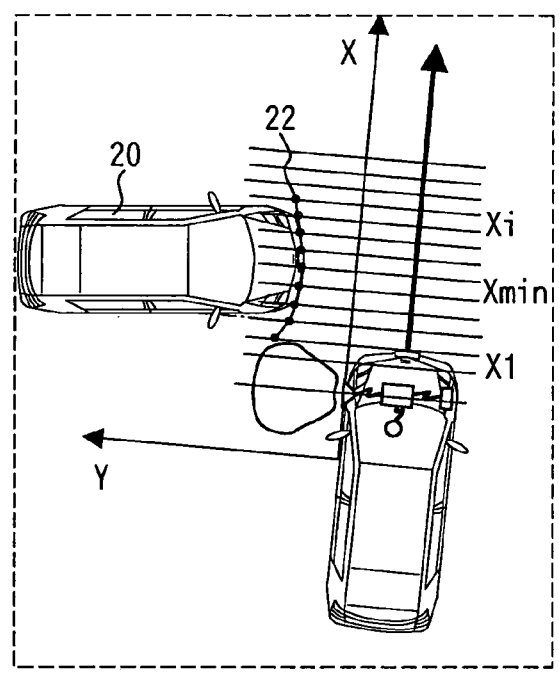
FIG. 9 is a view explaining a center position computation process.
Figure 10:
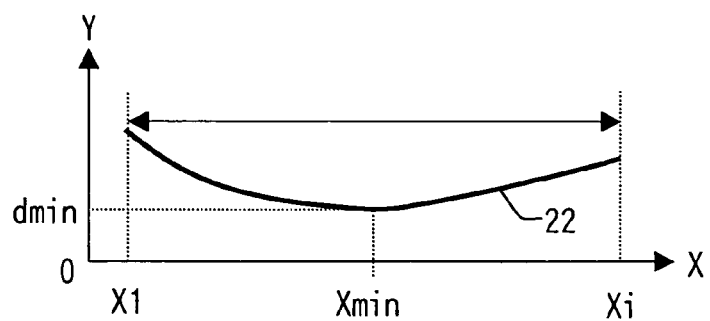
FIG. 10 is a graph explaining a center position computation process.

A principle for obtaining a center position of a parked vehicle based on a minimum detection distance data dmin will be explained with reference to FIGS. 9, 10. As shown in FIG. 9, a parked vehicle has a curved body surface in a horizontal direction from a central portion to a corner portion in a front portion. A curvature of the curved body surface is larger in a portion closer to the corner. The center position of the front portion of the parked vehicle 20 thereby protrudes most. The detection distance data di thereby becomes the minimum at the center position of the parked vehicle 20 as the subject vehicle passes by the parked vehicle 20. This positional relationship comes into effect also when the advance direction of the subject vehicle is deviated in some degree from a direction perpendicular to a longitudinal direction of the parked vehicle 20. When the detection distance data items di with respect to the parking vehicle 20 are connected to form a line segment 22, the line segment 22 becomes a circular arc as shown in FIG. 10. The advance distance data item Xi corresponding to the minimum value dmin located at the bottom of the arc comes to indicate the center position Xmin of the parked vehicle 20.

Figure 11:
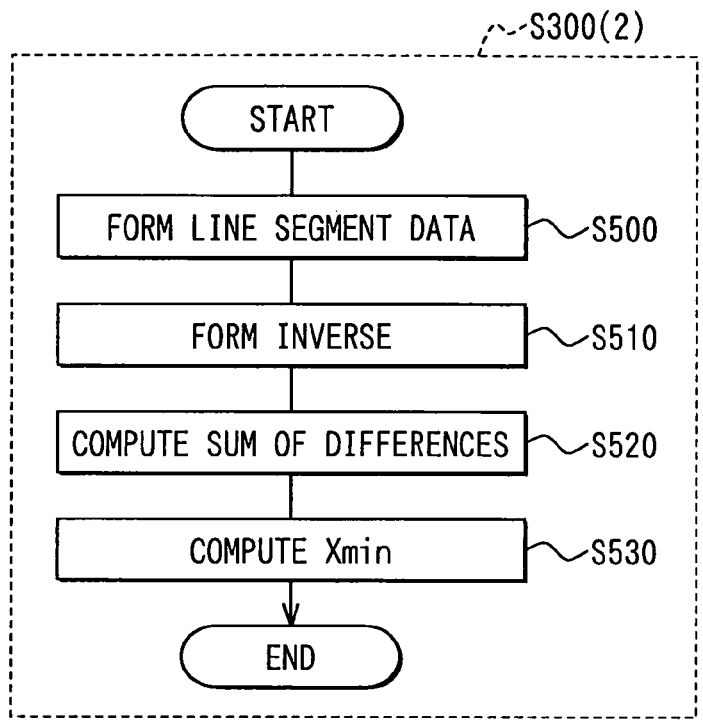
FIG. 11 is a flowchart diagram of another center position computation process.

This center position Xmin can be computed also in another method other than the above. FIG. 11 shows a flowchart diagram explaining another method. At Step S500, line segment data outlining the parked vehicle 20 is formed from the parked vehicle data. This process will be explained with reference to FIG. 12.

Figure 12:
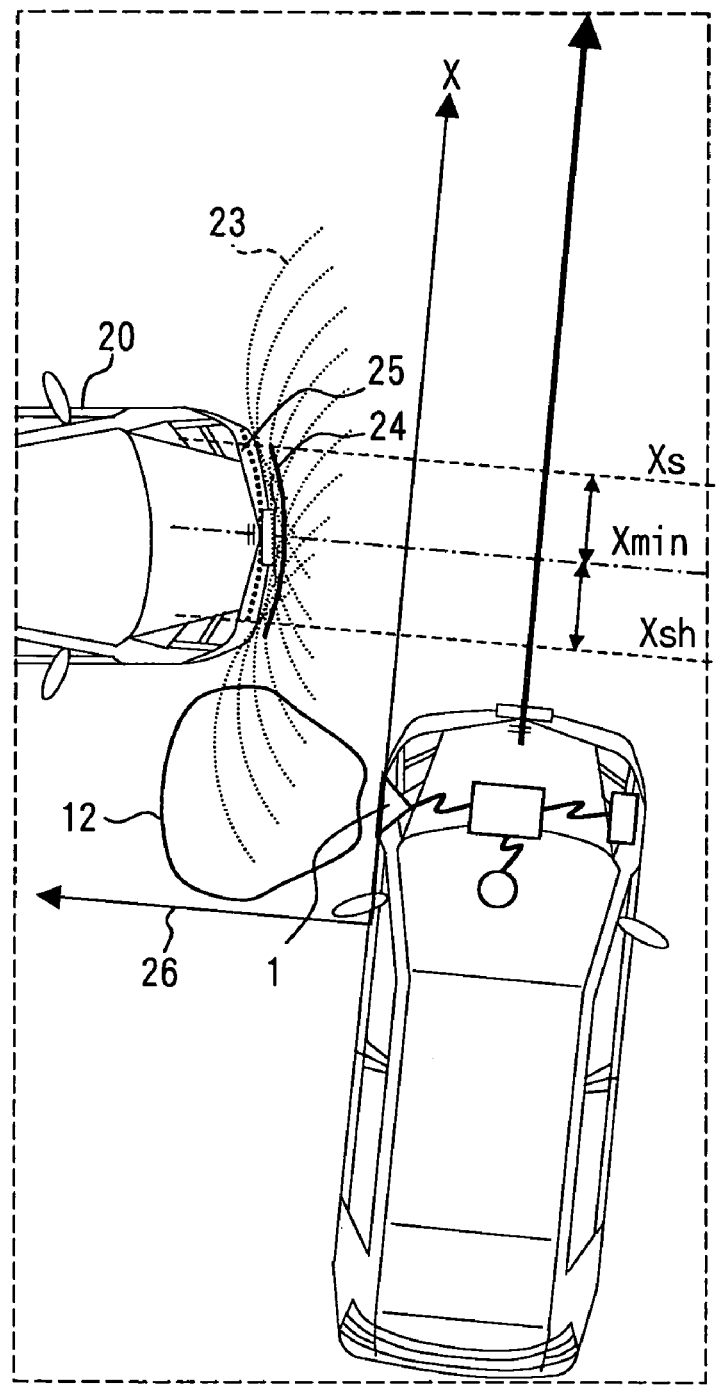
FIG. 12 is a view explaining another center position computation process.

As shown in FIG. 12, the ultrasonic sensor 1 has a detection range 12, so that the reflected ultrasonic waves are received from the parked vehicle 20 even before and after the setting position of the ultrasonic sensor 1 is situated just in front of the parked vehicle 20. Dotted lines 23 in FIG. 12 draw circular arcs having a center at the setting position of the ultrasonic sensor 1 to indicate positions where a reflecting obstruction (parked vehicle) may exist when the ultrasonic sensor 1 receives the reflected waves at each of the movement positions.

Therefore, the line segment data 24 outlining the parked vehicle 20 is formed by tracing outermost elements of the individual arcs. Here, of the outermost elements, portions corresponding to an arc just after start for detecting the parked vehicle 20 and an arc at last are not pertinent to an outline of the parked vehicle 20. They are thereby excluded from the line segment data 24. As a result, the line segment data 24 draws an outline excluding portions corresponding to the corners of the parked vehicle 20.

Figure 13A:
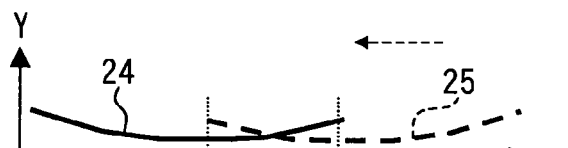
FIGS. 13A to 13E are graphs explaining another center position computation process.
Figure 13B:
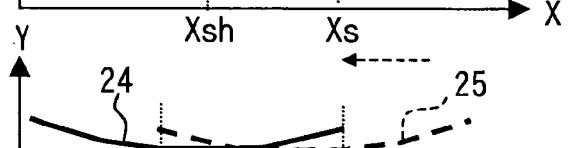
Figure 13C:
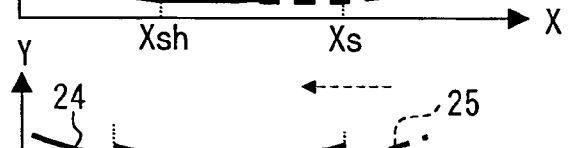
Figure 13D:
Figure 13E:
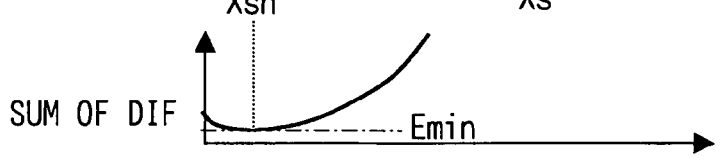

Next, at Step S510, the line segment data 24 formed at Step S500 are inversed in a time series to form an inverse line segment data 25. At Step S520, as shown in FIGS. 13A to 13D, the line segment data 24 and the inverse line segment data 25 are overlapped with an overlapping range being changed (or the inverse line segment data 25 (or Xsh) being moved like from FIG. 13A to FIG. 13D). Here, differences between the line segment data 24 and the inverse line segment data 25 while the overlapping ranges changed are individually summed up, as shown in FIG. 13E. At Step S530, a certain range (Xs to Xsh) corresponding to the minimum sum (Emin) of differences is designated and thereby the center of this certain range (Xs to Xsh) is determined as a center position Xmin of the parked vehicle 20.

This enables an accurate computation for the center position Xmin even when the subject vehicle moves slantwise with respect to a direction perpendicular to the longitudinal direction of the parked vehicle 20. In other words, as explained above, the front portion of the parked vehicle 20 is curved from the center portion to the corner portion. As a point is closer to the corner, the curvature of the point becomes larger. Suppose a case that the line segment data 24 outlining the parked vehicle 20 and its inverse line segment data 25 are overlapped with the overlapping point changed. In this case, the difference between both the line segment data 24, 25 becomes the minimum in a state where the center portions that have the minimum curvatures are overlapped. Here, the center of the overlapped range of both the line segment data 24, 25 becomes the center position Xmin.

The line segment data 24 and the inverse line segment data 25 are represented by an assembly of the detection distance data di pertinent to the central portions excluding the corner portions (or ends of the front portion) of the parked vehicle 20. When the sum of the differences between both the line segment data 24, 25 is computed, differences between detection distance data items di included in each of the line segment data 24, 25 are summed up.

Further, the center position Xmin of the parked vehicle 20 can be simply also determined as a center of the size (or width) of the parked vehicle 20 indicated by the advance distance data ΔXi.

When the center positions Xmin1, Xmin2 of the parked vehicles 20, 30 are thus computed, the sequence goes to Step S310 in FIG. 6, where a distance Xtar between both the parked vehicles 20, 30 is computed (Xtar=|Xmin2−Xmin1|). At next Step S320, sizes WL1, WL2 of the parked vehicles 20, 30 are computed. This process is shown in a flowchart diagram in FIG. 14.

Figure 14:
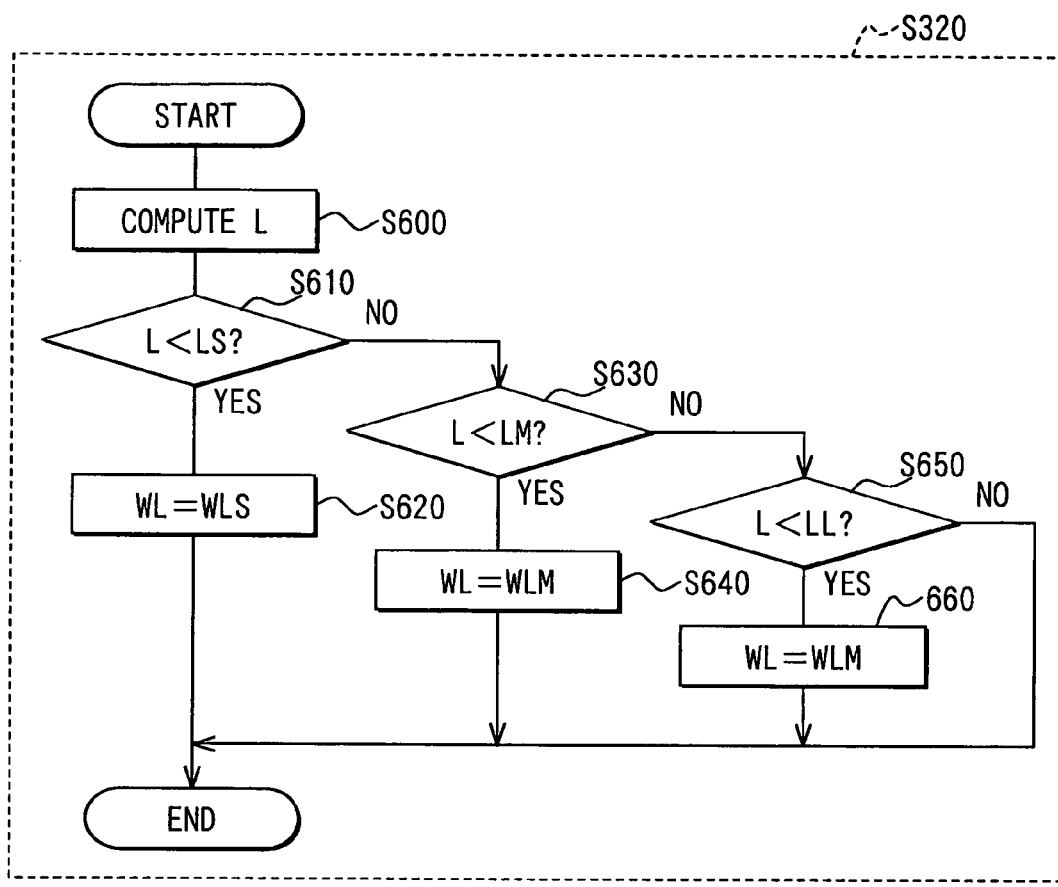
FIG. 14 is a flowchart diagram of a size computation process.

As shown in FIG. 14, at Step S600, the advance distance data items ΔXi of the parked data grouped with respect to the parked vehicle 20, 30 are summed up to obtain a length L of the parked vehicle 20, 30. At Step S610, the obtained length L is compared with a first reference value LS. When the length L is smaller than the first reference value LS, the sequence goes to Step S620, where the length WL of the parked vehicle 20, 30 is determined to a first given value WLS.

At Step S610, when the length L is not smaller than the first reference value LS, the sequence goes to Step S630. At Step S630, the obtained length L is compared with a second reference value LM (LM>LS). When the length L is smaller than the second reference value LM, the sequence goes to Step S640, where the length WL of the parked vehicle 20, 30 is determined to a second given value WLM (WLM>WLS).

At Step S630, when the length L is not smaller than the second reference value LM, the sequence goes to Step S650. At Step S650, the obtained length L is compared with a third reference value LL (LL>LM). When the length L is smaller than the third reference value LL, the sequence goes to Step S660, where the length WL of the parked vehicle 20, 30 is determined to a third given value WLL (WLL>WLM). Further, when the length L is not smaller than the third reference value LL, it is determined that an unexpected length L is detected. The process thereby ends without determining the length WL of the parked vehicle 20, 30.

Here, the length L of the parked vehicle that is obtained by summing up the advance distance data ΔXi is different from an actual length WL of the parked vehicle. The reason is as follows. The ultrasonic sensor 1 has a detection range 12 shown in FIG. 2, and the parked vehicle's corner has a complicated curve. Therefore, deviations occur in a position where the corner portion is detected by the ultrasonic sensor 1.

Further, in more detail, the ultrasonic sensor 1 generates ultrasonic waves in an arrow direction shown in FIG. 2 with the rough surface of the ultrasonic sensor 1 being a vibrating surface. However, the ultrasonic waves spread to a range having a center at the arrow, so the ultrasonic sensor 1 has a detection range 12. When an obstruction 11 such as a parked vehicle is not present at a position 13 just in front of the ultrasonic sensor 1 but is present within the detection range 12, the reflected waves from the obstruction 11 are received by the ultrasonic sensor 1. In particular, since the corner of the parked vehicle has a curved shape, there is a surface of the corner perpendicular to the transmitted waves even when the parked vehicle is not present just in front of the setting position of the ultrasonic sensor 1. Therefore, the parked vehicle is detected even when the parked vehicle is not present in front of the setting position of the ultrasonic sensor 1.

Suppose that the ultrasonic sensor 1 detects an obstruction such as a parked vehicle within the detection range 12 and a distance to the obstruction is R. Here, it is understood that the obstruction is present in an arc 14 with a radius R having a center at the position of the ultrasonic sensor 1, but the exact position of the obstruction cannot be designated. The ultrasonic sensor 1 usually detects a corner portion of the parked vehicle not only at the timing when the parked vehicle is situated perpendicularly or just in front of the setting position of the ultrasonic sensor 1, but also before or after this timing. Hence, the size of the parked vehicle is improperly computed to be larger than the actual size.

In this embodiment, in the size computation process, the computed length L is not directly used as a length WL of the parked vehicle, but is used for selecting as the length WL one of the first to third given values WLS, WLM, WLL that are shorter than the length L.

Figure 15A:
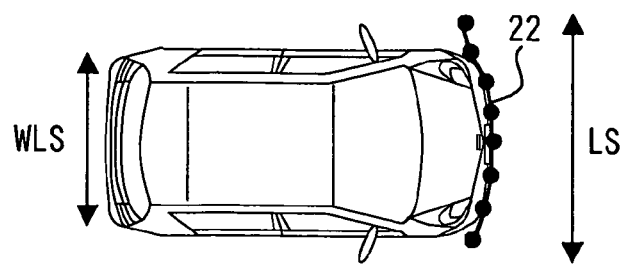
FIGS. 15A to 15C are views showing relationships between reference values and given values in a size computation process.
Figure 15B:
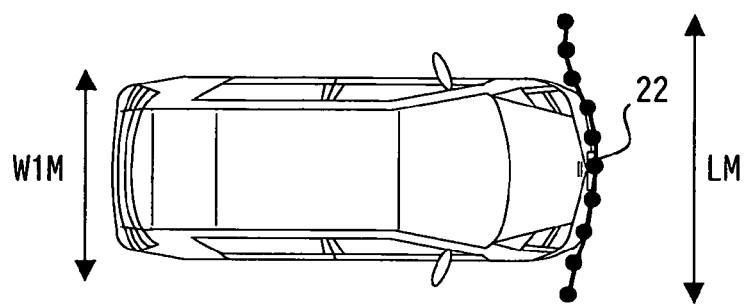
Figure 15C:
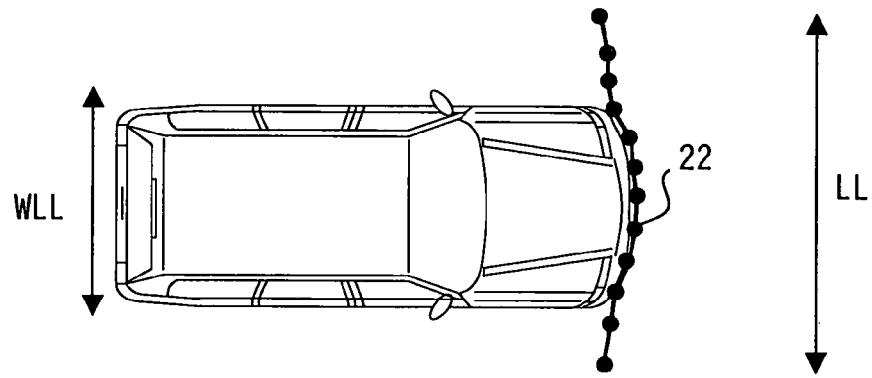

FIGS. 15A to 15C show a relationship between the first to third reference values LS to LL and the first to third given values WLS to WLL, respectively. Sizes (widths, lengths) of vehicles are almost grouped into representative sizes with respect to vehicle classes (e.g., mini-vehicle, standard-vehicle, large-vehicle) following standards of vehicles. The representative sizes for the individual vehicle classes can be set to the first to third given values WLS to WLL. Further, the first to third reference values LS to LL for determining the correspondence can be set based on experimental results.

In the above explanation, the size WL of the parked vehicle is determined based on three grouped levels; however, it can be determined based on more than three grouped levels. Further, the size WL can be determined by another method such as subtracting a given value from a computed length L or reducing to a length corresponding to a given ratio.

Thus, the sizes WL1, WL2 of the parked vehicles 20, 30 are computed. Next, the sequence goes to Step S330 in FIG. 6. Here, it is determined whether a parking space of the subject vehicle is secured between the two parked vehicles 20, 30. In detail, a distance Xtar is between the center positions Xmin1, Xmin2 of the parked vehicles 20, 30. A limited space value is computed by subtracting a length ((WL1+WL2)/2) corresponding to the parked vehicles 20, 30 from the distance Xtar. Then, it is determined whether the limited space value is more than an addition (W+dm) of the subject vehicle's width W and a margin dm. The margin dm is a margin for being parked, for instance, the sum of estimated gaps between the parked vehicle 20 and the subject vehicle and between the parked vehicle 30 and the subject vehicle after the subject vehicle is to be parked.

When this determination at Step S330 is negated, the sequence goes to Step S340, where notification that parking is impossible between the parked vehicles 20, 30 is displayed on the display 8. In contrast, when this determination at Step S330 is affirmed, the sequence goes to Step S350, where a space center position Xpos of a center in a space between the parked vehicles 20, 30 is computed. This space center Xpos is simply computed based on the already computed values of Xmin1, Xmin2, WL1, WL2. At Step S360, a final target parking region is set based on this space center position Xpos, i.e., with this space center position Xpos being centered. At Step S370, an automatic parking operation is conducted so that the subject vehicle is moved within the final target parking region.

Next, the second and third parking operations in FIG. 3 will be explained below. When a parked vehicle is determined to be not present in each of both the sides of the temporary target parking region at Step S170 in FIG. 3, the sequence goes to Step S190. Here, it is determined whether a parked vehicle is present in the left side of the temporary target parking region. When this determination is affirmed, the second parking operation takes place that parks the subject vehicle adjacent to the right side of the parked vehicle.

Figure 16:
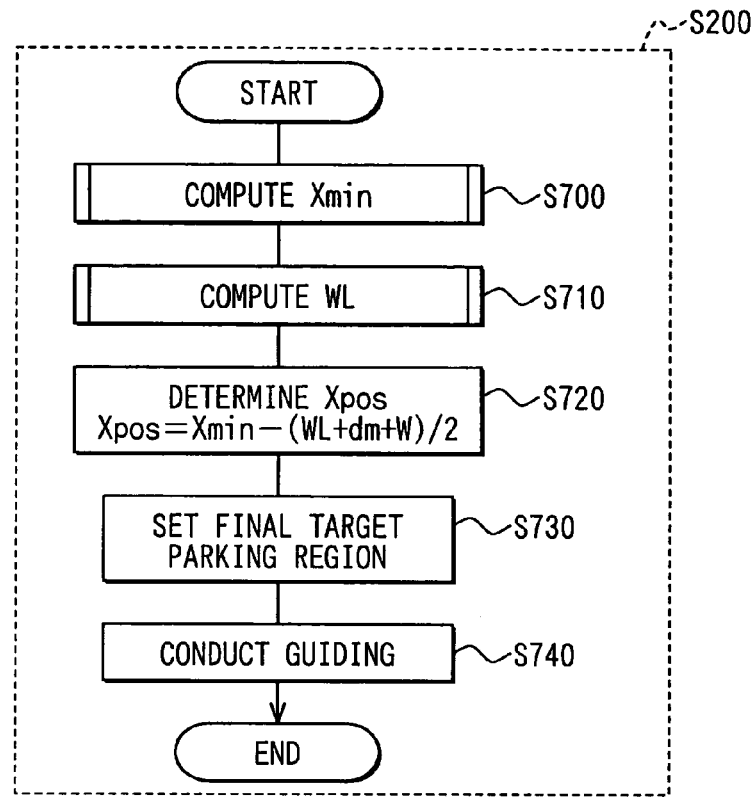
FIG. 16 is a flowchart diagram of a second parking assistance process.

FIG. 16 shows a flowchart diagram of the second parking operation. At Step S700, a center position Xmin of the parked vehicle 30 parked in the left side of the temporary target parking region is computed. At Step S710, a size WL of the parked vehicle 30 is computed. These center position Xmin and the size WL are computed similarly to the above-explained methods.

Figure 17:
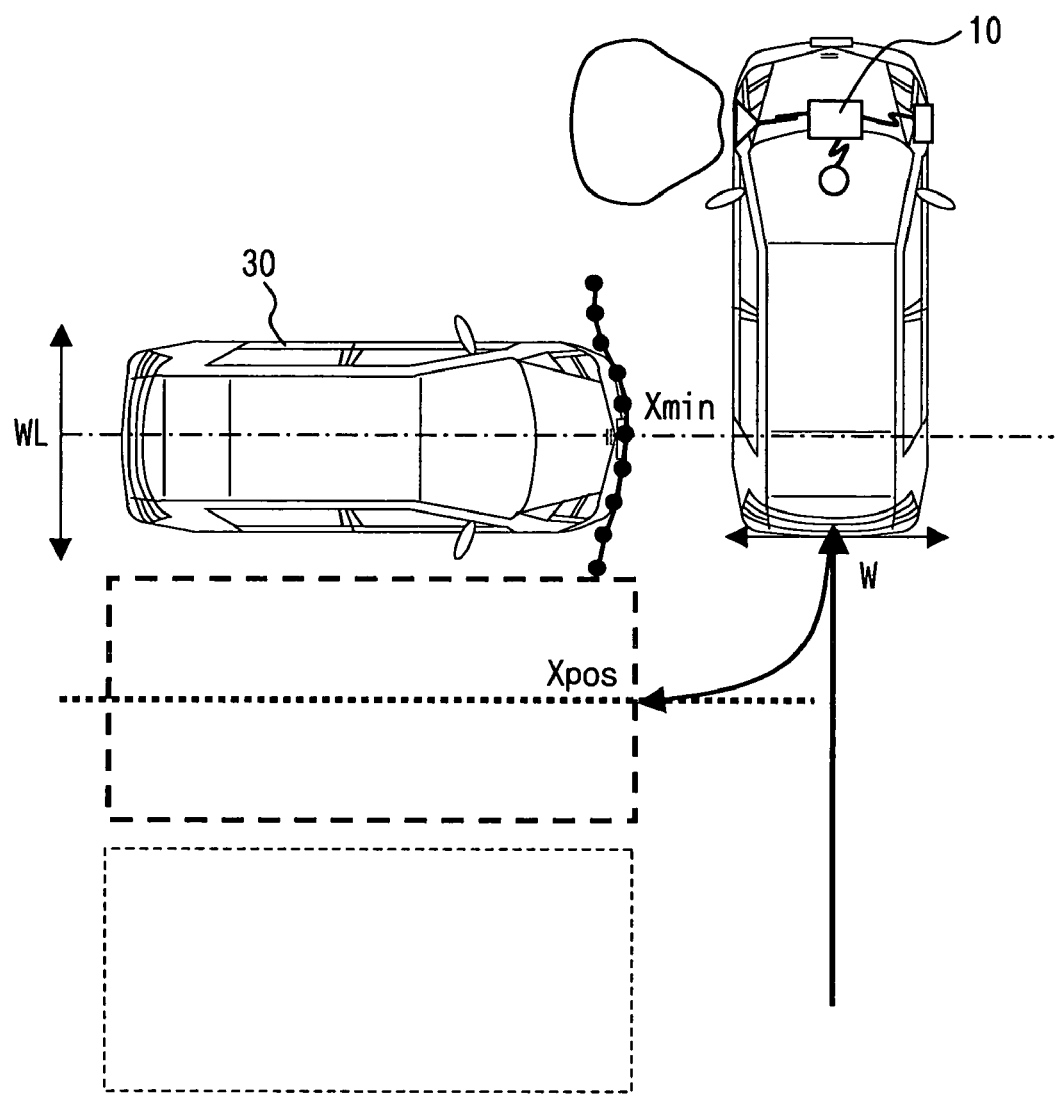
FIG. 17 is a view showing a second parking assistance process.
Figure 19:
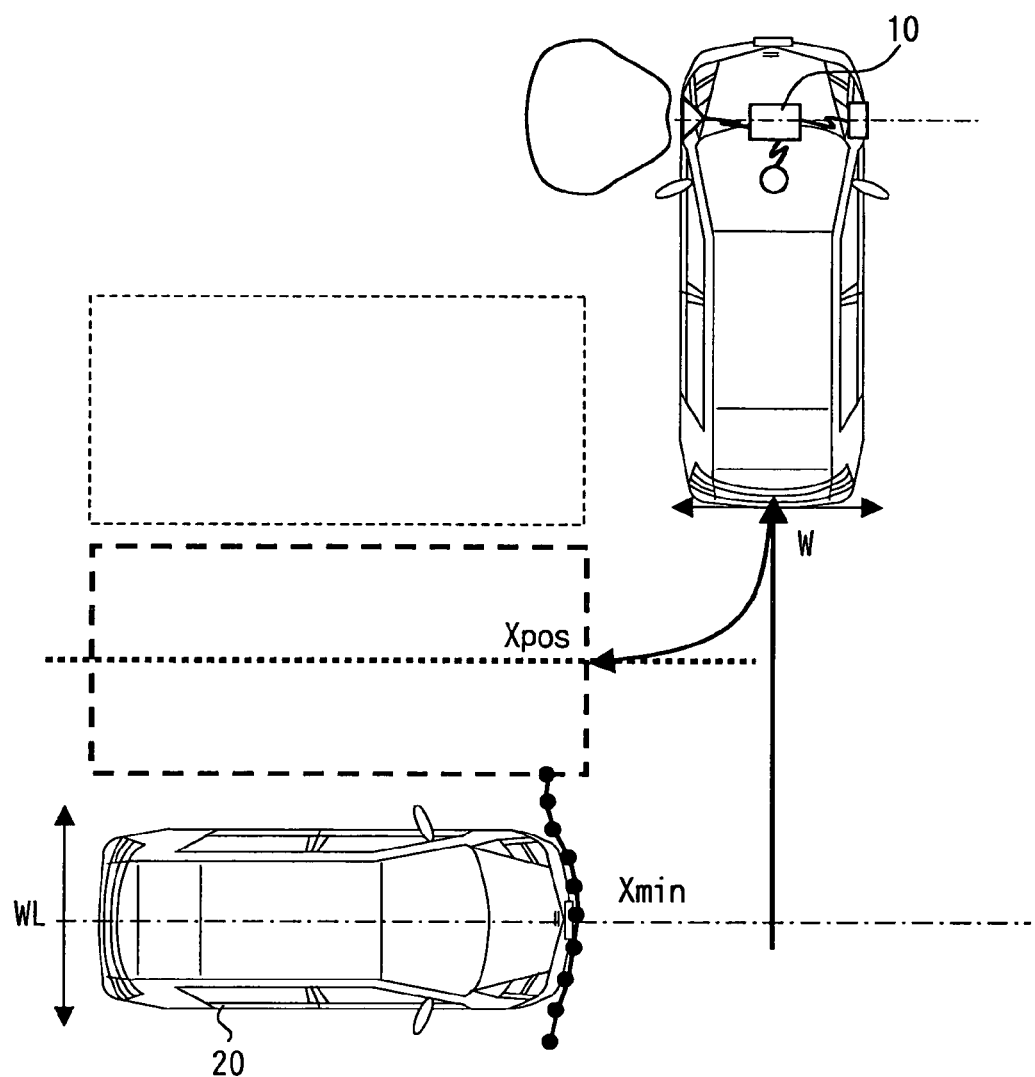
FIG. 19 is a view showing a third parking assistance process.

At Step S720, a space center position Xpos of a center in the target parking region is computed. As shown in FIG. 17, the subject vehicle is to be parked adjacent to the right side of the parked vehicle 30. Therefore, the center position Xpos is computed by dividing by two the sum of the size WL of the parked vehicle 30, a margin dm for being parked, and the width W of the subject vehicle, and then subtracting the divided result from the center position Xmin of the parked vehicle 30.

At Step S730, a final target parking region is set based on the computed center position Xpos. At Step S740, an automatic parking operation is conducted so that the subject vehicle is moved within the final target parking region.

In contrast, when the determination at Step S190 is negated, the sequence goes to Step S210. Here, it is determined whether a parked vehicle is present in the right side of the temporary target parking region. When this determination is affirmed, the third parking operation takes place that parks the subject vehicle adjacent to the left side of the parked vehicle.

Figure 18:
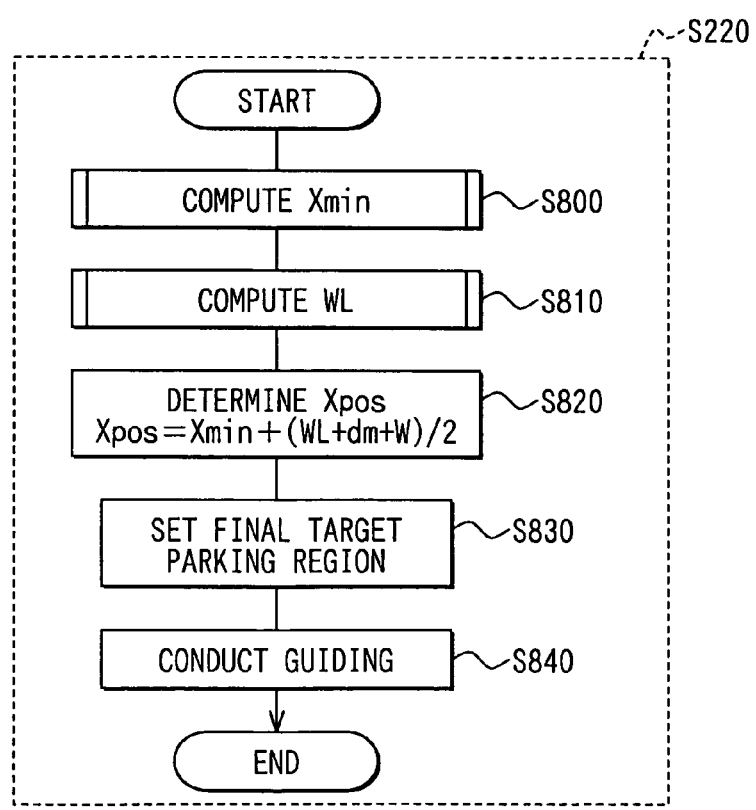
FIG. 18 is a flowchart diagram of a third parking assistance process.

FIG. 18 shows a flowchart diagram of the third parking operation, which is basically similar to that of the second parking process. At Step S800, a center position Xmin of the parked vehicle 20 parked on the right side of the temporary target parking region is computed. At Step S810, a size WL of the parked vehicle 20 is computed.

Here, in the third parking assistance process, the subject vehicle is to be parked in the left side of the parked vehicle 20, so a space center position Xpos of a center in the target parking region is computed at S820 differently from that of the second parking assistance process. The center position Xpos is computed by dividing by two the sum of the size WL of the parked vehicle 20, a margin dm for being parking, and the width W of the subject vehicle and then adding this divided result to the center position Xmin of the parked vehicle 20.

Subsequent process is similar to that of the second parking assistance process. At Step S830, a final target parking region is set based on the computed center position Xpos. At Step S840, an automatic parking operation is conducted so that the subject vehicle is moved within the final target parking region.

Further, when no parking space for the subject vehicle is found rearward of the subject vehicle and a temporary target parking region cannot be set, the determinations at Steps S170, S190, S210 are all negated. No parking assistance process can be conducted. In this case, notification of "No parking space is available" can be conducted.

As explained above, according to this embodiment, a target parking region is almost automatically set, so a time or a work load with respect to a parking assistance process can be significantly decreased.

(Others)

In the above embodiment, an ultrasonic sensor is used for measuring a distance to a parked vehicle; however, another measuring sensor can be used instead. For instance, this can be an infrared sensor, a radio wave-type sensor, a laser radar, or the like. Further, more than one ultrasonic sensor can be disposed on the one side of a subject vehicle so that position detection is triangulated.

In the above embodiment, a trigger for starting a parking assistance process is turned on when a transmission is switched to a shift position for going back. However, as long as going back of the subject vehicle is detected, any can be substituted for the transmission sensor.

In the above embodiment, once a target parking region is finally set, an automatic parking operation is conducted. However, a parking assistance process can be designed to indicate a steering direction or a steering amount during the parking operation using a display or a voice.

Further, in the above embodiment, parking is executed by moving back of a subject vehicle. However, even when parking is executed by advancing of the subject vehicle, a target parking region can be automatically set by adopting the present invention.

It will be obvious to those skilled in the art that various changes may be made in the above-described embodiments of the present invention. However, the scope of the present invention should be determined by the following claims.

What is claimed is:

1. A parking assistance system provided in a subject vehicle, the system comprising:
    a first distance measuring unit that measures a distance from a side of the subject vehicle to a parked vehicle based on a time period from when transmitting a signal that is transmitted from the side with directionality to when receiving a reflected signal;
    a second distance measuring unit that measures an advance distance in an advance direction of the subject vehicle;
    a storing unit that associates parked-vehicle distance data with advance distance data to store the parked-vehicle distance data and the advance distance data, wherein the parked-vehicle distance data indicates distances that are repeatedly measured by the first distance measuring unit while the advance distance data indicates advance distances measured by the second distance measuring unit;
    a size determining unit that determines a size of the parked vehicle in the advance direction of the subject vehicle so that the size is shorter than a distance corresponding to the advance distance data;
    a setting unit that sets a target parking region adjacent to the parked vehicle based on the size, wherein the subject vehicle is expected to be parked in the target parking region; and
    an operation assisting unit that computes a positional relationship between the subject vehicle and the parked vehicle based on the parked-vehicle distance data and the advance distance data and then conducts an operation assistance for parking the subject vehicle in the target parking region.

2. The parking assistance system of claim 1,
    wherein the size determining unit
        classifies a distance corresponding to the advance distance data into a plurality of distance ranges and
        determines a predetermined size pertinent to each of the distance ranges as the size of the parked vehicle.

3. The parking assistance system of claim 1,
    wherein the size determining unit
        determines a center position of the parked vehicle in the advance direction based on the parked-vehicle distance data and the advance distance data that is associated with the parked-vehicle distance data and
        then determines a position of the parked vehicle to allow the size determined, based on the center position.

4. The parking assistance system of claim 3,
    wherein the size determining unit
        computes line segment data indicating an outline of the parked vehicle based on the parked-vehicle distance data and the advance distance data,
        compares the line segment data with an inverse line segment data that is inverse to the line segment data while changing an overlapping range to thereby obtain a given overlapping range corresponding to a minimum total difference between the line segment data and the inverse line segment data, and
        determines a center position of the parked vehicle from a center position of the given overlapping range.

5. The parking assistance system of claim 4,
    wherein, when the size determining unit compares the line segment data with the inverse line segment data, an outline of an end of the parked vehicle is excluded from being indicated by the line segment data.

6. The parking assistance system of claim 3,
    wherein the size determining unit
        obtains a given position where a minimum distance from the subject vehicle to the parked vehicle is obtained using the advance distance data and determines a center position of the parked vehicle based on the given position obtained.

7. The parking assistance system of claim 3, wherein, in a case that the setting unit sets the target parking region in a range sandwiched between two parked vehicles, the size determining unit determines a center position and a size of each of the two parked vehicles and sets the target parking region when a parked space is more than a size of the subject vehicle, wherein the parked space is obtained by subtracting individual half sizes of the two parked vehicles from a distance between the center positions of the two parked vehicles.

8. The parking assistance system of claim 7, wherein, only when the parked space is more than a sum of the size of the subject vehicle and a margin that is further considered for parking, the setting unit sets the target parking region.

9. The parking assistance system of claim 1, wherein, when the subject vehicle stops and a transmission of the subject vehicle is switched to a shift position for going back, the setting unit sets the target parking region adjacent to either side of the parked vehicle based on a relative position to the parked vehicle and on whether an obstruction is present in a region adjacent to the parked vehicle.

* * * * *